United States Patent [19]

Nagasaki et al.

[11] 4,166,609
[45] Sep. 4, 1979

[54] DEVICE FOR DETECTING SURFACE LEVEL OF SCUM IN SCUM REMOVING APPARATUS

[75] Inventors: Katsumi Nagasaki, Sakai; Koichi Tanimura, Suita; Yoshihiro Inoue; Hiroyuki Yamazaki, both of Amagasaki; Tetsuo Momose, Hirakata, all of Japan

[73] Assignee: Kubota, Ltd., Osaka, Japan

[21] Appl. No.: 825,595

[22] Filed: Aug. 18, 1977

[30] Foreign Application Priority Data

Aug. 19, 1976 [JP] Japan .................................. 51-99451
Aug. 19, 1976 [JP] Japan .................................. 51-99452

[51] Int. Cl.² .............................................. C21C 7/04
[52] U.S. Cl. ...................................... 266/86; 266/201; 73/304 R; 266/99
[58] Field of Search .................. 73/304 R, 343 R; 266/86, 201, 227, 99

[56] References Cited

U.S. PATENT DOCUMENTS

| 3,131,335 | 4/1964 | Berglund et al. ................ 73/304 R |
| 3,184,970 | 5/1965 | McNelly ........................... 73/304 R |
| 3,395,908 | 8/1968 | Woodcock ............................. 266/99 |
| 3,862,574 | 1/1975 | Antoine et al. ..................... 73/343 R |
| 3,979,108 | 9/1976 | Nagasaki et al. ..................... 266/201 |

Primary Examiner—Roy Lake
Assistant Examiner—Paul A. Bell
Attorney, Agent, or Firm—Joseph W. Farley

[57] ABSTRACT

In a scum removing apparatus including a suction source, a suction pipe having one end communicating with the suction source and the other free end positioned above the surface of scum to suck the scum and apply water to the sucked scum in the vicinity of the free end, and a scum separator provided at an intermediate portion of the suction pipe, a device for detecting the level of the scum surface relative to the free end of the suction pipe. The detecting device comprises a pair of electrode rods provided on the outer periphery of the free end of the suction pipe and projecting from the pipe end by a suitable length, and means for detecting variations in the electric resistance between the electrode rods. The electrode rod comprises a tube having accommodated therein a slider slidingly projectable from the front end of the tube and slidingly retractable into the tube. The slider is supported by a spring in its retracted position within the tube and connected to means for pushing out the slider from the front end of the tube against the action of the spring.

6 Claims, 4 Drawing Figures

DEVICE FOR DETECTING SURFACE LEVEL OF SCUM IN SCUM REMOVING APPARATUS

This invention relates to a device for use in a scum removing apparatus for detecting the surface level of scum.

In ironworks, molten blast furnace iron is tapped out into a ladle or is poured into a converter in which the molten pig iron is converted into steel. The steel is thereafter run into molds. The operation in casting factories includes the steps of tapping out the molten metal from the cupola, desulfurization, preparation of alloys, inoculation, etc. With any of these procedures, there is the necessity of removing slag from the top of the molten metal before the pouring of the molten metal; otherwise detrimental impurities would be incorporated into the metal, giving defective castings.

With other factories handling high-temperature molten materials, it is necessary to remove scum from the surface of the molten material as in the glass melting furnace of glass factories. The term "scum" as used herein and in the appended claims refers generally to slag and scum on various molten materials.

Various scum removing methods have heretofore been used which include one recently proposed in U.S. Pat. No. 3,979,108 as an efficient method. The proposed method employs a suction pipe communicating with a vacuum pump, blower or like suction means and having an inlet end positioned above the surface of scum on the top of molten material. The scum is drawn into the suction pipe from the surface of the molten material, whereupon water is applied to the sucked scum in the vicinity of the pipe inlet to rapidly cool and solidify the scum. The scum is thereafter removed from the sucked air stream at an intermediate portion of the suction pipe upstream of the suction means. However, if the inlet end of the suction pipe is brought too close to the scum surface, the amount of sucked scum abruptly increases relative to the amount of the cooling water, permitting uncooled scum to be deposited on an intermediate portion of the pipe to clog up the pipe, with the detrimental result that the water forced out into the suction pipe from the inlet end portion will not be drawn toward the suction means but will fall onto the scum or molten material. The molten material will then adhere to the inlet portion and clog up the inlet, possibly rendering the suction pipe no longer operative. Conversely if the inlet end of the suction pipe is positioned away from the scum surface by a greater distance than is desired, an efficient sucking operation will not be achievable. Thus the inlet end of the suction pipe must be positioned properly above the scum surface. It is therefore essentially required that the suction pipe be provided with a device for detecting the level of the scum surface relative to the inlet end of the suction pipe.

The foregoing reference discloses such a detecting device comprising a static pressure chamber, a nozzle for forcing out gas from the pressure chamber against the surface of scum and means for detecting variations in the internal pressure of the pressure chamber, such that variations in the distance between the nozzle and the scum surface are detected in terms of the variations in the pressure of the pressure chamber. However, because the accuracy of the distance measured is relatively low and because the gas pressure within the static pressure chamber is greatly subject to the influence of temperature variations, the measured values are not fully reliable for the determination of accurate position of the suction pipe inlet end.

Although other high-precision devices for detecting the surface level of molten materials are known, none of them prove to be fully durable in the severe environment in which the device is always subjected to fumes, dusts and the high temperature of the molten material as well as to marked temperature changes since there is a great difference between the ambient temperature during sucking operation and the ambient temperature while the removing apparatus is out of operation.

An object of this invention is to provide a device for detecting the surface level of scum for use in some removing apparatus which device has a simple construction and is capable of accurately positioning the inlet end of the suction pipe.

To fulfill this object, the present invention provides a device for detecting the surface level of scum comprising a pair of electrode rods provided on the outer periphery of the front end of a suction pipe and projecting from the pipe end by a suitable length, and means for detecting variations in the electric resistance between the electrode rods.

When the lower ends of the electrode rods of the present device come into proximity or contact with the scum surface, the electrode rods become electrically connected to each other to some extent by way of the scum, entailing a variation in the electric resistance between the electrode rods. Conversely stated, this variation, when detected, indicates that the ends of the electrode rods have come into proximity or contact with the scum surface, making it possible to accurately detect that the distance between the front end of the suction pipe and the scum surface equals the specified distance related to the length of projection of the electrode rods from the pipe front end.

According to a preferred embodiment of this invention, each of the electrode rods comprises a tube having accommodated therein a slider slidingly projectable from the front end of the tube and slidingly retractable into the tube, so that even when some scum adheres to the end of the electrode rod, the scum can be removed from the rod end by projecting the slider from the end. This renders the detecting device properly operable at all times.

Another preferred embodiment of this invention includes, in addition to the foregoing pair of electrode rods, at least one electrode rod, preferably another pair of electrode rods, projecting from the suction pipe end by a smaller length than the first pair of electrode rods. The additional electrode rod or rods serve as ultimate safety means for preventing the suction pipe front end from coming into the scum or molten material, even when the first pair of the electrode rods or means associated therewith should malfunction owing to a break of the conductor or for some other cause. Provision of one additional electrode rod can be useful, because one of the first pair of electrode rods, which is grounded through the suction pipe, can function almost free of any failure and is therefore serviceable also for the additional electrode rod as a pair.

Other features and advantages of this invention will be readily understood from the following dewcription of the preferred embodiments of the invention which reference to the accompanying drawings, in which.

Figure 1:
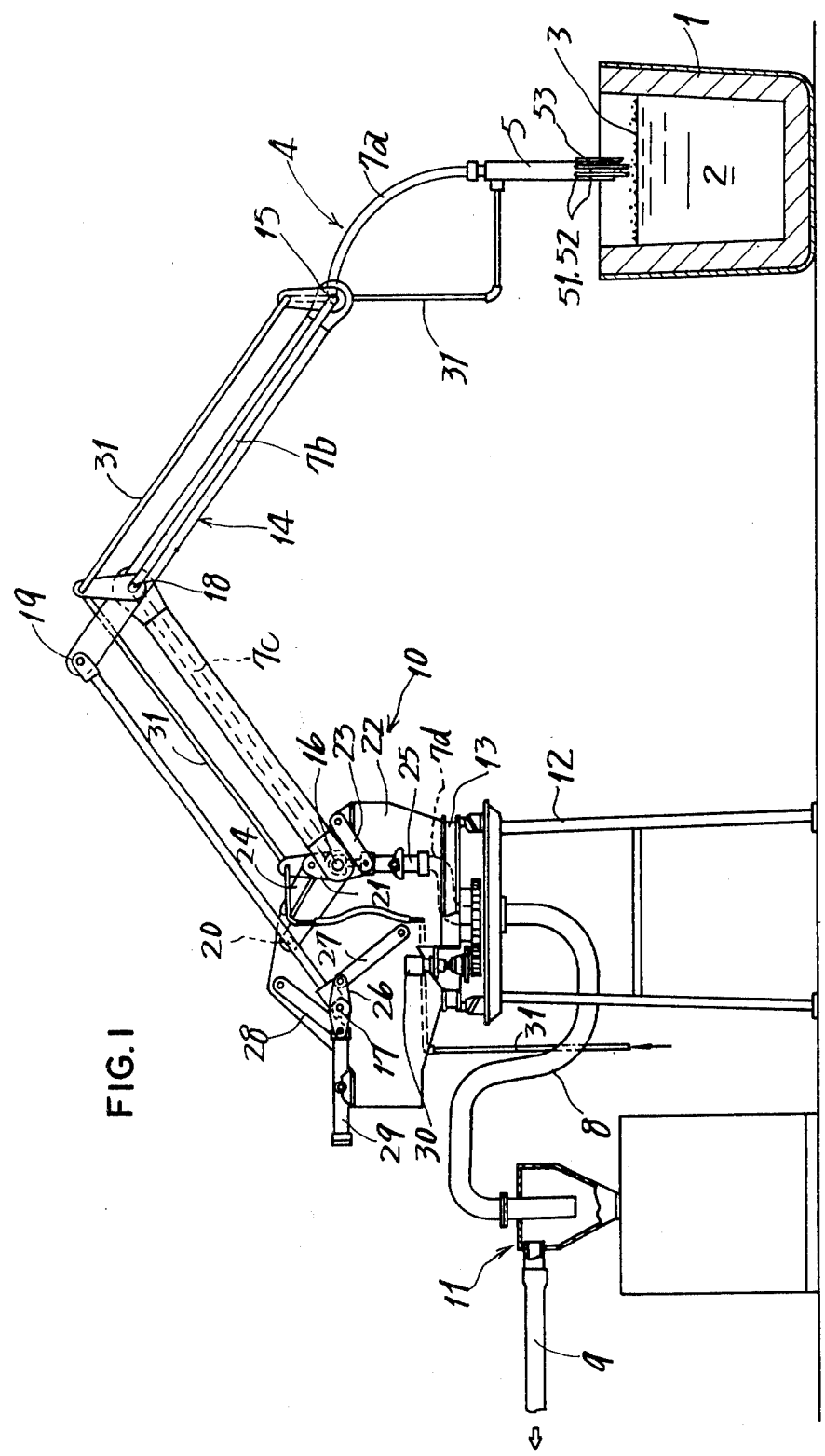
FIG. 1 is a front view partly broken away and showing a scum removing apparatus in its entirety.
Figure 2:
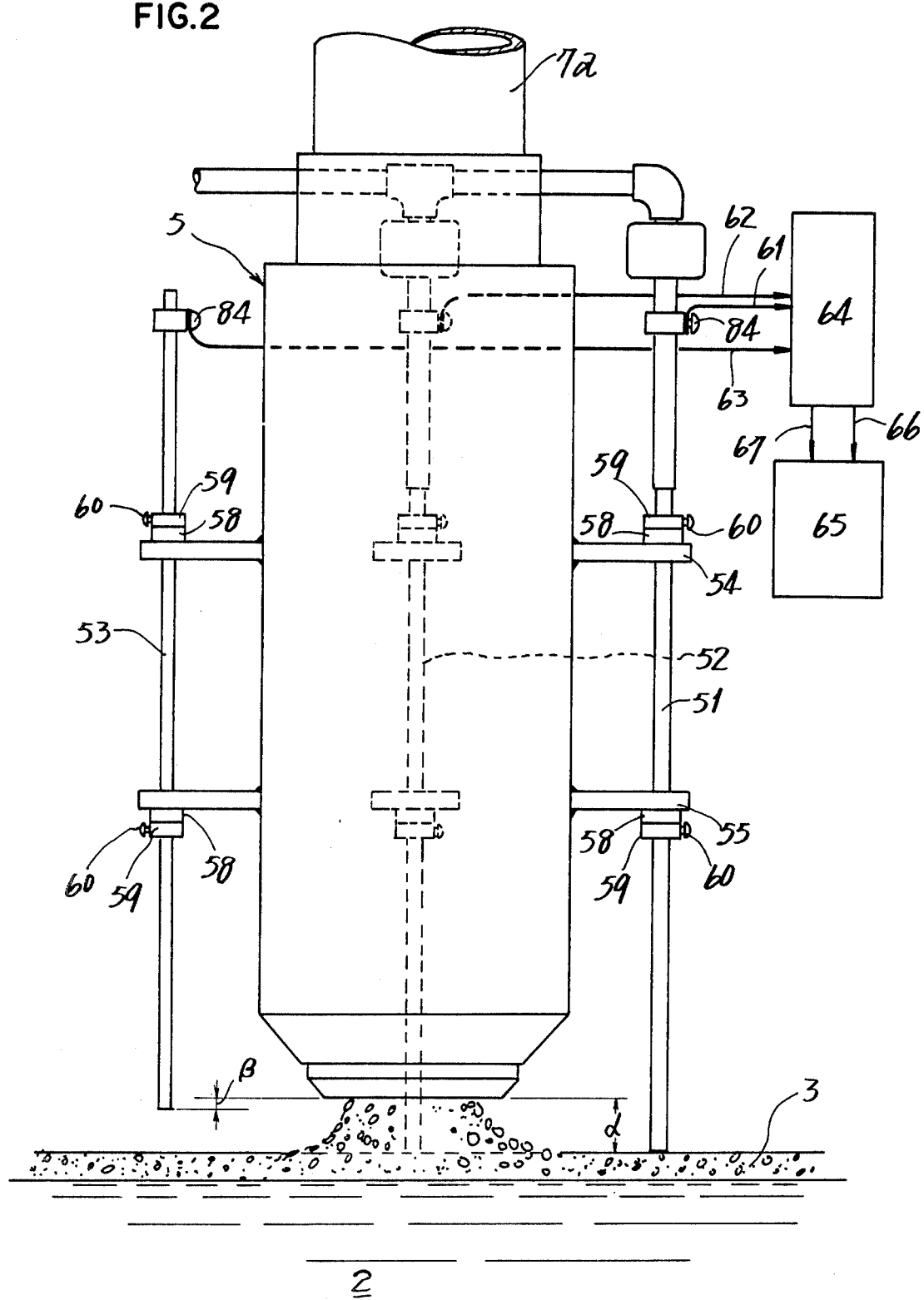
FIG. 2 is an enlarged side elevation showing a suction head.

With reference to FIG. 1, the specific structure of a scum removing apparatus will be described first. The drawing shows a ladle 1, molten metal 2 contained in the ladle and the scum 3 to be removed by suction from the top of the molten metal 2. A suction pipe 4, communicating with unillustrated suction means such as a vacuum pump or blower, has a free end providing a suction head 5. The suction pipe 4 is composed of the suction head 5, pipe portions 7a, 7b, 7c, 7d provided on a suction head support 10, a pipe portion 8 connecting the support 10 to a scum separator 11, and a pipe portion 9 connecting the scum separator 11 to the suction means.

The suction head support 10 supports the suction head 5 for three-dimensional movement in vertical and horizontal directions, whereby the front end of the suction head 5; namely, the front end of the suction pipe 4, can be brought to a predetermined level at any desired position above the surface of the scum 3. The suction head support 10 comprises a frame 12, a swivel table 13 swiveable on the frame 12 and pantograph means 14 mounted on the swivel table 13 and including three free points 15, 16, 17 horizontally aligned. The suction head 5 is supported at the free point 15 on one end of the pantograph means 14. The other two points 16, 17 are supported by the swivel table 13. The pantograph means 14 includes pivots 18, 19, 20. The free point 16 of the means 14 is supported at the center of an oval link 21. A pair of links 23, 24 are pivoted at their base ends to a support plate 22 extending upwardly from the swivel table 13. The links 23 are pivoted at their free ends to the opposite ends of the oval link 21 respectively. Cylinder means 25 mounted on the support plate 22 is adapted to vertically move the oval link 21, vertically moving the free point 16 straight, whereby the suction head 5 is vertically movable straight. Similarly, the free point 17 on the other end is supported at the center of an oval link 26. A pair of links 27, 28 pivoted at their base ends to the support plate 22 are pivotally connected at their free ends to the opposite ends of the oval link 26. Cylinder means 29 mounted on the support plate 22 is adapted to horizontally move the oval link 26 and to thereby reciprocally horizontally move the free point 17 straight, whereby the suction head 5 is moved reciprocally horizontally straight. Indicated at 30 is a motor for swiveling the table 13, and at 31 a water conduit connected to a cooling jacket within the suction head 5. The cooling water supplied from the conduit 31 to the jacket is injected into the suction pipe within the suction head 5 through a nozzle provided at the lower end of the jacket to rapidly cool and solidify the scum drawn into the suction pipe.

Figure 4:
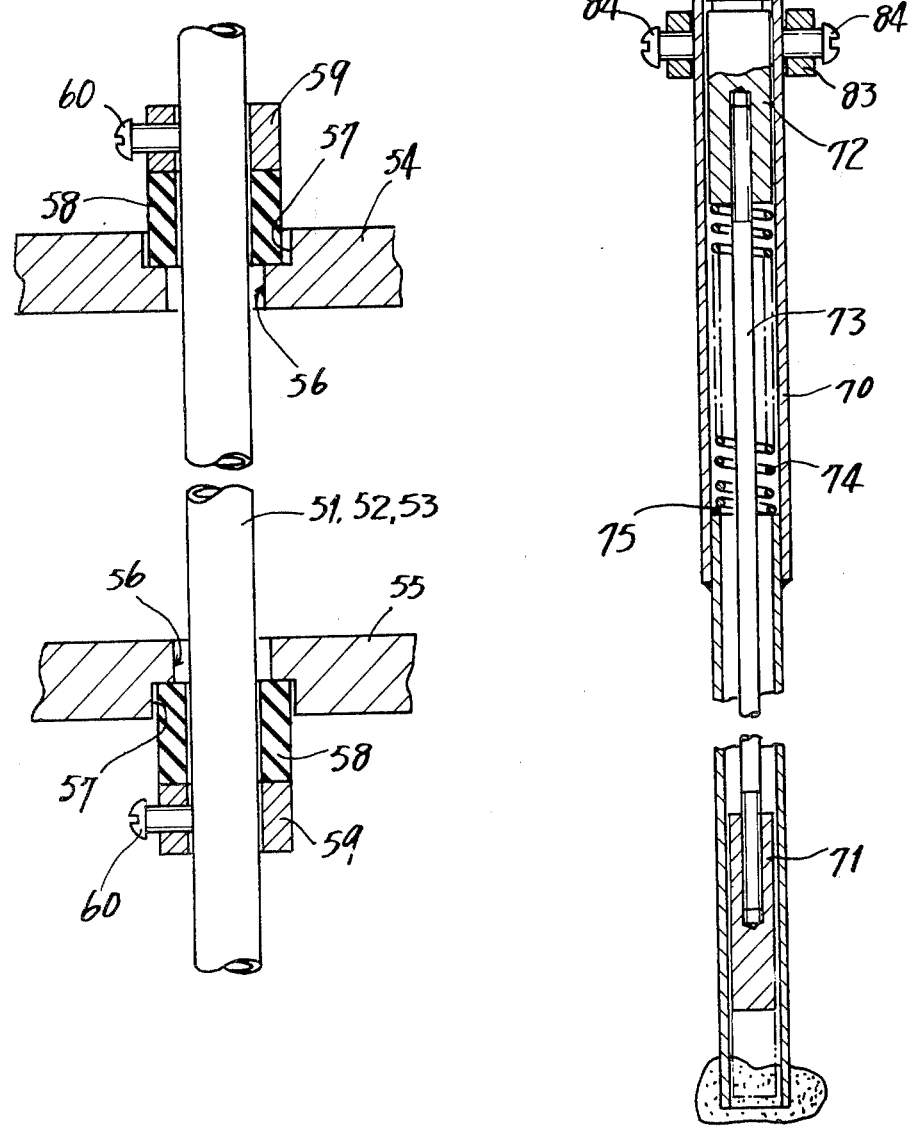
FIG. 4 is an enlarged view in vertical section showing mountings for the electrode rod.

The suction head 5 of the scum removing apparatus is provided on its outer periphery with a pair of electrode rods 51, 52 insulated therefrom and spaced apart from each other by a specified distance. The front ends of the electrode rods 51, 52 project from the front end of the suction head 5 by a length $\alpha$ which is substantially equal to the distance between the front end of the suction head 5 and the surface of the scum 3 which distance is most suitable for the suction of the scum. However, the length $\alpha$ of projection of the electrode rods 51, 52 is not always equal to the most suitable distance; in special cases the length $\alpha$ of projection may be made smaller than the optimum distance, because the relation therebetween alters with the kind of power supply to the rods 51, 52 as well as with the ambient atmosphere. Like the electrode rods 51, 52, an auxiliary electrode rod 53 is attached to the suction head 5. The electrode rod 53 projects from the front end of the suction head 5 by a length $\beta$ which is smaller than the length $\alpha$. The auxiliary electrode rod 53 serves as ultimate safety means for preventing the suction head 5 from coming into the scum 3 or molten metal 2 when the electrode rods 51, 52 or means associated therewith malfunction as when some solid scum adheres to the rod or a relay malfunctions. The electrode rod 53 is coupled to means by which the suction head 5 is raised in an emergency detected by the rod 53. Accordingly, the absolute value of the length $\beta$ may be small insofar as the suction head 5 can be prevented from entering the scum 3 before being raised in response to the detection of emergency by the electrode 53. Provision of one auxiliary electrode rod 53 may be useful, because one of the electrode rods 51, 52, which is grounded through the suction head 5, can function almost free of any failure and is therefore serviceable also for the auxiliary electrode rod 53 as a pair. However, in preparation for the possible failure of the grounded electrode rod 51 or 52, it is preferable to provide a pair of auxiliary electrode rods. Brackets 54, 55 for supporting the electrodes 51, 52, 53 are provided on the outer peripheral surface of the suction head 5. Each of the brackets is formed in its end with a recess 57 having a bore 56 through which the electrode extends as seen in FIG. 4. A bush 58 of insulating material fitting around the electrode rod is fitted in each recess 57. A collar 59 fitting around the electrode rod bears on the bush 58 and is fastened to the rod by a locking screw 60. In this way the electrode rods 51, 52, 53 are supported by the brackets 54, 55 in insulated state and are shiftable for adjustment.

A detector 64 for detecting variations in electric resistance has two input terminals to which signal wires 61, 62 extending from the electrode rods 51, 52 are connected respectively. One of the electrode rods 51, 52 is grounded. The grounded electrode rod or the signal wire thereof is connected to the suction head 5. The signal wire thereof may be dispensed with. Another signal wire 63 extending from the auxiliary electrode rod 53 is connected to another input terminal of the detector 64. Control means 65 controls the cylinder means 25, 29 and motor 30 for the movement of the suction head 5 in response to an output signal from the detector 64. The detector 64 applies a potential difference for example of d.c. 12 V across the electrode rods 51, 52 and is adapted to detect a variation in the electric resistance between the electrode rods 51, 52, i.e. a change from insulation to the specified state of conduction therebetween, in terms of a change in the current or voltage value. The resulting output signal is fed to the control means 65, in response to which the control means 65 halts the descending movement of the suction head 5 or functions to raise the head 5. The specified structure of the detector 64 of the type described will be apparent to one skilled in the art and will not be stated. It is also possible to employ a system other than the foregoing system for the detection of variations in the resistance between the electrode rods. Alternatively, the detector 64 may be adapted to continuously detect variations in the resistance between the electrode rods and may be set for a specified permissible range of resistivities, such that the detector gives the control means 65 an output signal while detecting resistivities above the upper limit, a different output signal while detecting the resistivities in the specified range and a still different signal while detecting resistivities below the lower limit, so as to automatically control the level of the suction head 5 relative to the scum surface. In the same manner as above, the detector 64 detects variations in the resistance between the auxiliary electrode rod 53 and the grounded electrode rod 51 or 52, namely, the specified state of conduction therebetween. The resulting signal is impressed, by way of the signal wire 67, on the control means 65, which in turn halts or quickly raises the suction head 5 against the emergency detected.

Preferably, the electrode rods 51, 52, 53 may be made of metal having good electric conductivity such as copper, aluminum or steel or, most preferably, stainless steel in view of resistance to heat and to corrosion. The electrode rods 51, 52, 53 may be in the form of a solid rod. In the case of the electrode rods 51, 52, however, the electrode rods preferably have the structure to be described below and shown in FIG. 3, since the rod ends frequently come into contact with the scum 3 or are immersed therein.

Figure 3:
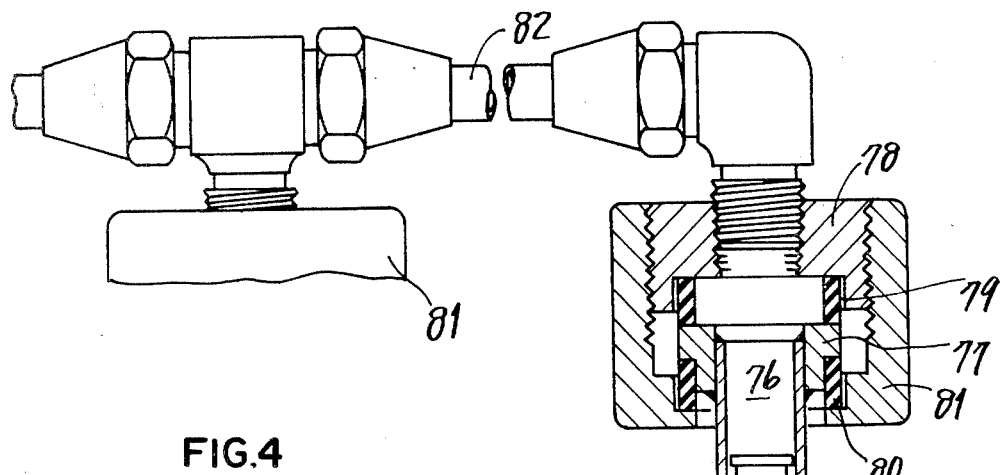
FIG. 3 is an enlarged view in vertical section showing an electrode rod.

With reference to FIG. 3, the electrode rod comprises a pipe 70 having accommodated therein a slider 71 for forcing out the scum, the slider being slidingly projectable from the front end of the pipe and slidingly retractable into the pipe 70. A piston 72 slidably housed in the pipe 70 is connected by a rod 73 to the slider 71. A spring 74 elastically supports the slider 71, biasing the slider 71 toward its retracted position within the pipe at all times. The spring 74 is provided between the piston 72 and a stepped portion 75 provided within the pipe 70 and positioned toward the front end relative to the piston 72. An upper space within the pipe 70 above the piston 72 provides a pressure chamber 76 defined by a connecting flange 77 secured to the upper end of the pipe, a connector 78 positioned above the flange 77 for connection to a pressure fluid duct 82, and a tubular member 79 of insulating material interposed between the connecting flange 77 and the connector 78. To tightly connect the connecting flange 77 to the connector 78, a cap nut 81 is screwed on the connector 78 with an insulating tubular member 80 provided between the flange 77 and the nut 81. Compressed air or like pressure fluid is supplied to the pressure chamber 76 through the duct 82. A connector ring 83 fitting around the pipe 70 is secured to the pipe by a screw 84 which serves also as a connecting terminal.

The device of the construction described above will operate in the following manner, with the suction head 5 under manual remote control or semi-automatic control. The length α of projection of the electrode rods 51, 52 is set at a value slightly greater than the distance between the suction head 5 and the surface of the scum 3 required for safety. The suction head 5 is brought to a suitable level above the scum surface by the operation of the control means 65. When desired, the suction head 5 is further moved in a horizontal direction. The apparatus is operated for the removal of the scum 3. When the suction head 5 comes too close to the scum 3 during the operation, the ends of the electrode rods 51, 52 come into contact with the scum 3 or possibly with the molten metal 2, with the result that the electrode rods 51, 52 are brought into conduction with each other by way of the scum 3 or molten metal 2. This is detected by the detector 64, whereupon the control means 65 operates. If desired, alarm means will be actuated. In the case of the suction head support shown in FIG. 1, the control means 65 functions to change over an electromagnetic valve incorporated in the channel for supplying pressure fluid to the cylinder means 25, whereby the piston of the cylinder means 25 in its retracted position advances, pushing up the intermediate free point 16 of the pantograph means 14 and thereby quickly raising the suction head 5. Thus the front end of the suction head 5 is held out of contact with the scum 3 which otherwise would clog up the front end, rendering the suction head inoperative. The construction of the suction head support 10 is not limited to the illustrated pantograph means 14, but a different structure is usable which may involve collapsing and extending movements as combined in three-dimensional directions. The drive means is not limited to hydraulic means; an electric motor or the like is similarly useful.

When some scum adheres to the front end of the electrode rod 51 or 52, or every time a run of scum removing operation has been completed, compressed air is fed to the pressure chamber 76 via the duct 82. The air forces the piston 72 downward against the action of the spring 74, projecting the slider 71 from the front end of the pipe 70 and causing the slider 71 to remove the scum from the pipe end. Although the embodiment described includes piston-and-cylinder means housed in the pipe 70 for slidingly driving the slider 71, the drive means is not limited to the disclosed structure. Separately provided cylinder means is usable. Alternatively, the slider may be made movable by cam means or the like.

What is claimed is:

1. In a scum removing apparatus having a suction pipe, a device for detecting the surface level of the scum comprising:
    a pair of electrode rods provided on the outer periphery of the front end of the suction pipe and projecting from the pipe end by a suitable length;
    means for detecting variations in the electric resistance between the electrode rods; and
    each of the electrode rods comprising a tube having accommodated therein a slider slidingly projectable from the front end of the tube and slidingly retractable into the tube.

2. A detecting device as defined in claim 1 wherein the upper portion of the tube slidably houses a piston connected to the slider by a rod, the piston being provided with a spring for elastically supporting the slider in a retracted position within the tube, the tube being provided at its upper end with a connecting flange connected by tubular members of insulating material to connectors for a pressure fluid supply duct.

3. Apparatus for removing scum including a suction head, means supporting the suction head for movement in at least a vertical direction relative to the surface of the scum, and actuating means for vertically moving the suction head, wherein the improvement comprises:
    a pair of electrode rods provided on the outer periphery of the front end of the suction head and projecting from the front end by a suitable length, one of the electrode rods being grounded;
    a third electrode rod projecting from the front end of the suction head end by a smaller length than the pair of electrode rods;
    means for detecting variations in the electric resistance between the pair of electrode rods and between the grounded electrode rod and the third electrode rod; and control means for controlling the actuating means in response to a signal from the detecting means indicative of a variation in the electric resistance between the pair of electrode rods whereby the level of the suction head relative to the scum surface is automatically controlled, the control means being operable to cause a rapid raising of the suction head in response to a signal from the detecting means indicative of a variation in the electric resistance between the grounded electrode rod and the third electrode rod.

4. A detecting device as defined in claim 3 wherein each of the electrode rods comprises a tube having accomodated therein a slider slidingly projectable from the front end of the tube and slidingly retractable into the tube.

5. A detecting device as defined in claim 4 wherein the slider is supported by a spring in its retracted position within the tube, and the electrode rod is provided with means for pushing out the slider from the front end of the tube against the action of the spring.

6. A detecting device as defined in claim 5 wherein the pushing means comprises cylinder means operative by a pressure fluid and a rod connecting the piston member of the cylinder means to the slider.

* * * * *